United States Patent [19]

Abe

[11] Patent Number: 5,034,894
[45] Date of Patent: Jul. 23, 1991

[54] SELF-DIAGNOSIS SYSTEM FOR A MOTOR VEHICLE

[75] Inventor: Kunihiro Abe, Higashimurayama, Japan

[73] Assignee: Fuji Jukogyo Kabushiki Kaisha, Tokyo, Japan

[21] Appl. No.: 333,999

[22] Filed: Apr. 4, 1989

[30] Foreign Application Priority Data

Apr. 11, 1988 [JP] Japan .................................. 63-88752

[51] Int. Cl.⁵ ..................... G01M 15/00; F02D 41/26; F02P 17/00
[52] U.S. Cl. ............................... 364/431.01; 73/117.2; 364/551.01
[58] Field of Search ....................... 364/431.01, 424.03, 364/551.01; 73/116, 117.2, 117.3, 119 R, 119 A

[56] References Cited

U.S. PATENT DOCUMENTS

| 4,527,424 | 7/1985 | Takahashi | 73/119 A |
| 4,694,408 | 9/1987 | Zaleski | 364/551.01 |
| 4,748,843 | 6/1988 | Schäfer et al. | 73/117.3 |
| 4,757,463 | 7/1988 | Ballou et al. | 364/551.01 |
| 4,798,082 | 1/1989 | Fujikawa et al. | 73/117.3 |

FOREIGN PATENT DOCUMENTS 59-24270 2/1984 Japan .

Primary Examiner—Felix D. Gruber
Attorney, Agent, or Firm—Martin A. Farber

[57] ABSTRACT

Various detectors are provided for detecting engine operating conditions and for continuously producing an operating condition signal during operation of an engine. A self-diagnosis device is responsive to the operating condition signal for detecting an abnormality in the signal and for producing a data signal. A nonvolatile memory is provided for storing the data signal. The data signal is indicated on a display on an outside computer.

5 Claims, 4 Drawing Sheets

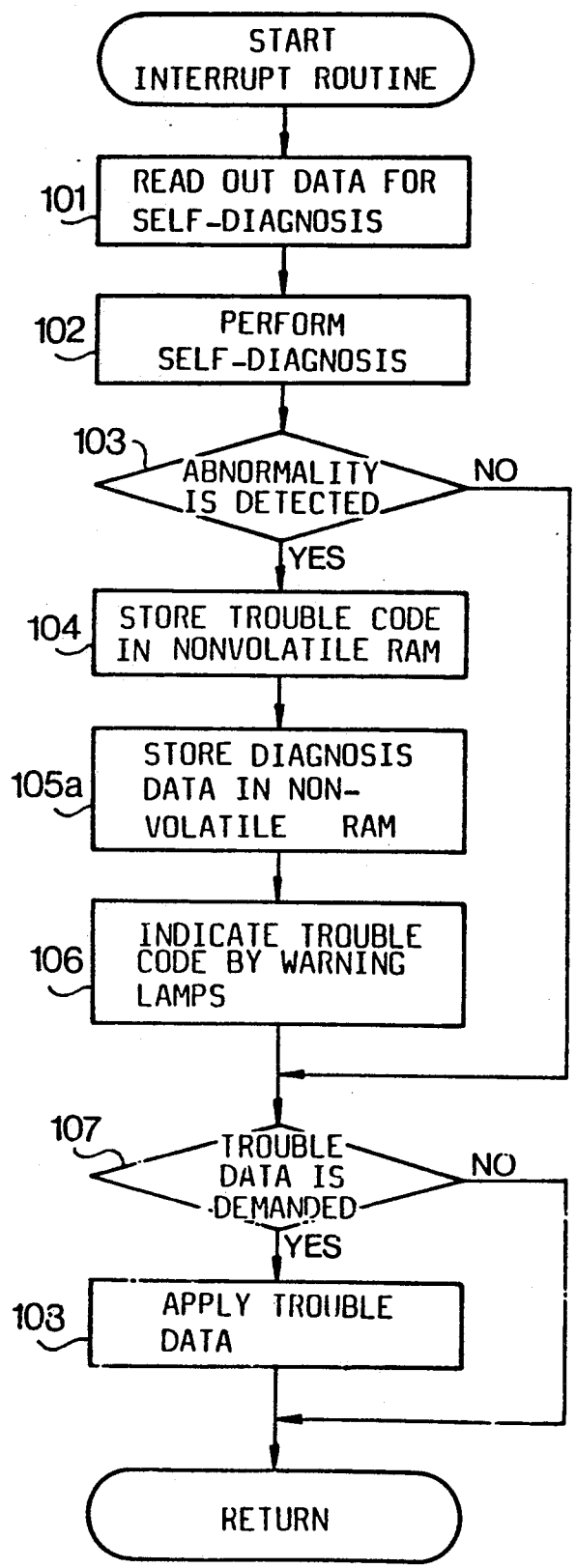
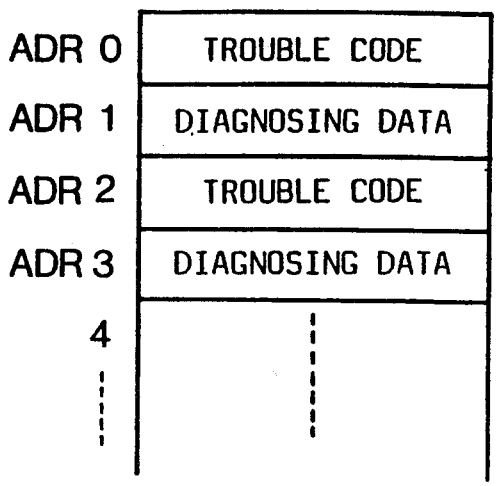
FIG. 6
FIG. 5

SELF-DIAGNOSIS SYSTEM FOR A MOTOR VEHICLE

BACKGROUND OF THE INVENTION

The present invention relates to a self-diagnosis system for a motor vehicle.

Recently, a motor vehicle has been equipped with an electronic control system for controlling various components of an engine, such as fuel injectors, thereby improving driveability, exhaust gas emission, fuel consumption, and engine power. The electronic control system controls the components based on information represented by output signals from various sensors for detecting engine operating conditions. Accordingly, if malfunctions of components and sensors occur, the engine does not properly operate.

However, because of the complexity of the electronic control system, it is difficult to immediately find out the trouble. Accordingly, a self-diagnosis device for easily checking the electronic control system should be provided in the motor vehicle.

Japanese Patent Application Laid Open 59-24270 discloses an electronic control system provided with the self-diagnosis system where signaling lamps provided on the vehicle are lit or flashed to indicate a trouble code representing a defective part in the control system when abnormalities occur in sensors and actuators such as injectors. Data of the troubles are written in a backup random-access memory (RAM) at a predetermined address, which is provided in the electronic control system. A diagnostician in an auto shop reads out the trouble code indicated by lamps or a display of a computer which is connected to the vehicle. Thus, information on the trouble is recognized by the diagnostician so that the defective parts such as sensors and switches can be appropriately repaired.

However, in the conventional diagnosis system, an abnormality which occurs only under a particular driving condition which can not reoccur in the auto shop can not be diagnosed in the shop. Thus, the repair is troublesome and in some cases, the cause of the abnormality cannot be thoroughly explained.

SUMMARY OF THE INVENTION

The object of the present invention is to provide a self-diagnosis system where an abnormality which cannot reoccur in the shop is easily detected, thereby enabling an immediate and precise repair of the vehicle. That is, it is very difficult at the auto shop to repeat the same condition by which the abnormality occurred in the past.

According to the present invention, there is provided a self-diagnosis system for a motor vehicle comprising detector means for detecting engine operating conditions and for producing an operating condition signal during operation of an engine, an engine control data calculator responsive to the operating condition signal for producing an engine control signal, self-diagnosis means responsive to the operating condition signal and to the engine control signal for detecting an abnormality in both the signals and for producing a data signal including a location of trouble, a nonvolatile memory for storing the data signal, and output means responsive to an input signal for producing an output signal representing the stored data signal.

The other objects and features of this invention will become understood from the following description with reference to the accompanying drawings.

BRIEF DESCRIPTION OF DRAWINGS

FIG. 5 is a flowchart showing an operation of a modification of the present invention; and FIG. 6 is a diagram showing a table for storing trouble codes and diagnosing data in a modification shown in FIG. 5.

DETAILED DESCRIPTION OF THE PREFERRED EMBODIMENTS

Figure 1:
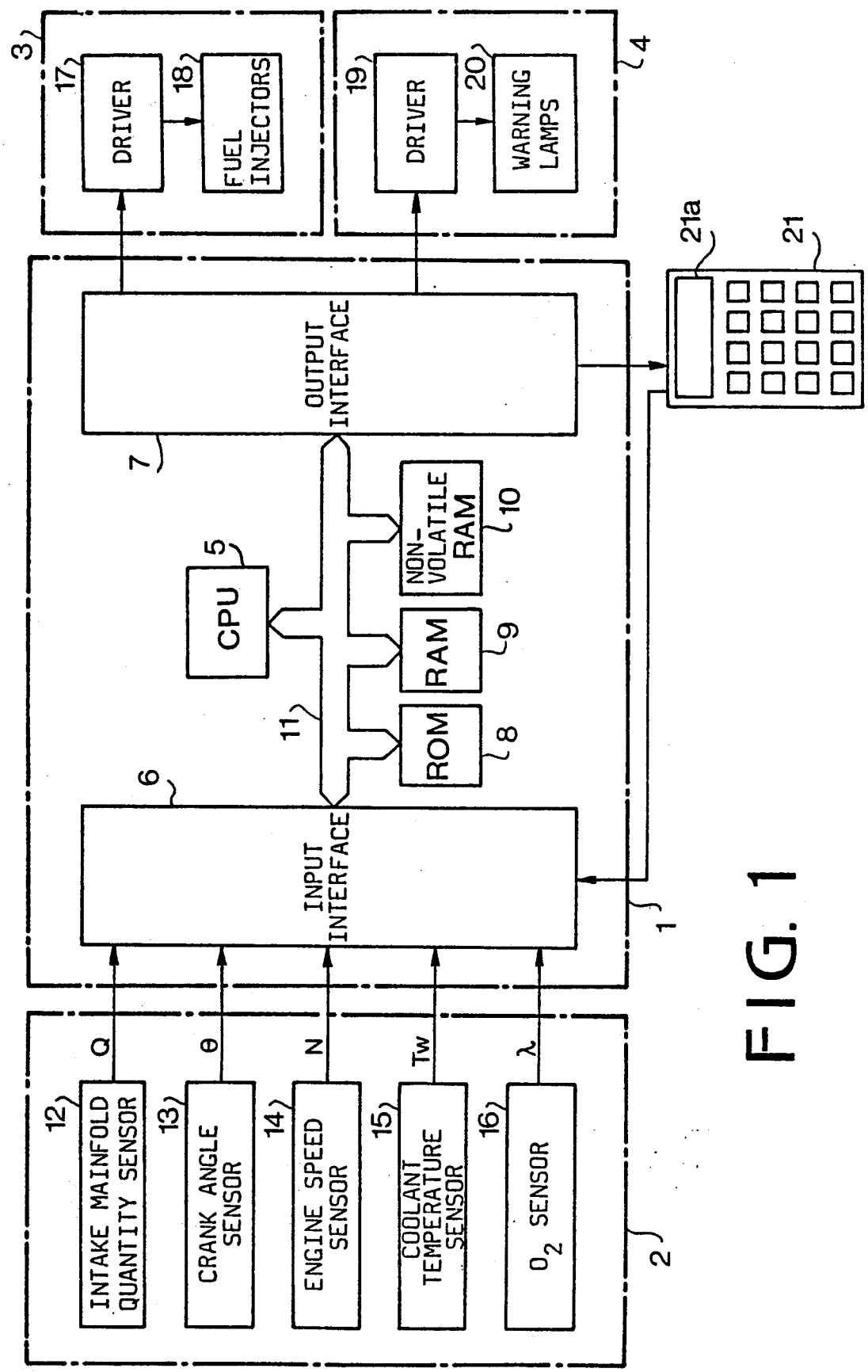
FIG. 1 is a block diagram of a diagnosis system according to the present invention.

An automobile is equipped with an electronic control system 1 for controlling various components of an engine. Referring to FIG. 1, the electronic control system 1 comprises a central processor unit (CPU) 5, a random access memory (RAM) 9, a read only memory (ROM) 8, a nonvolatile random access memory (RAM) 10, an input interface 6 and an output interface 7. These CPU 5, RAM 9, RAM 10, ROM 8, and input and output interfaces 6 and 7 are connected to each other through a bus line 11. Programs and data for controlling the engine and fixed data such as trouble codes representing trouble data and trouble location are stored in the ROM 8. The RAM 10 is to store trouble data codes and the trouble location of codes.

The input interface 6 is applied with a coolant temperature signal Tw from a coolant temperature sensor 15, an air-fuel ratio feedback signal λ from an $O_2$ sensor 16, an intake-air quantity signal Q from an intake manifold quantity sensor 12, a crank angle signal O from a crank angle sensor 13, and an engine speed signal N from an engine speed sensor 14. The sensors 12 to 16 and other sensors and switches (not shown) form an operating condition (engine parameter) detecting means 2. These signals from the sensors and switches are temporarily stored in the RAM 9 after processing the data in the CPU 5. The CPU 5 produces control signals, which are applied through the output interface 7 to an engine operating means 3. The engine operating means 3 comprises a driver 17 and fuel injectors 18 for controlling the air-fuel ratio of the engine.

The CPU 5 further sends a signal through the output interface 7 to a warning means 4 having a driver 19 and warning lamps 20. When an abnormality is detected in the system 1 by self-diagnosis function, a corresponding trouble code is read out from the ROM 8 so as to turn on or flash the warning lamps 20, thereby indicating the trouble code.

An outside diagnosis device 21 having a display 21a is detachably connected with the input interface 6 and output interface 7 of the control system 1. The diagnosis device 21 is operated by a diagnostician so that the calculated data on engine operating conditions which are stored in the RAM 9 and trouble codes stored in the nonvolatile RAM 10 are indicated on the display 21a.

Figure 2:
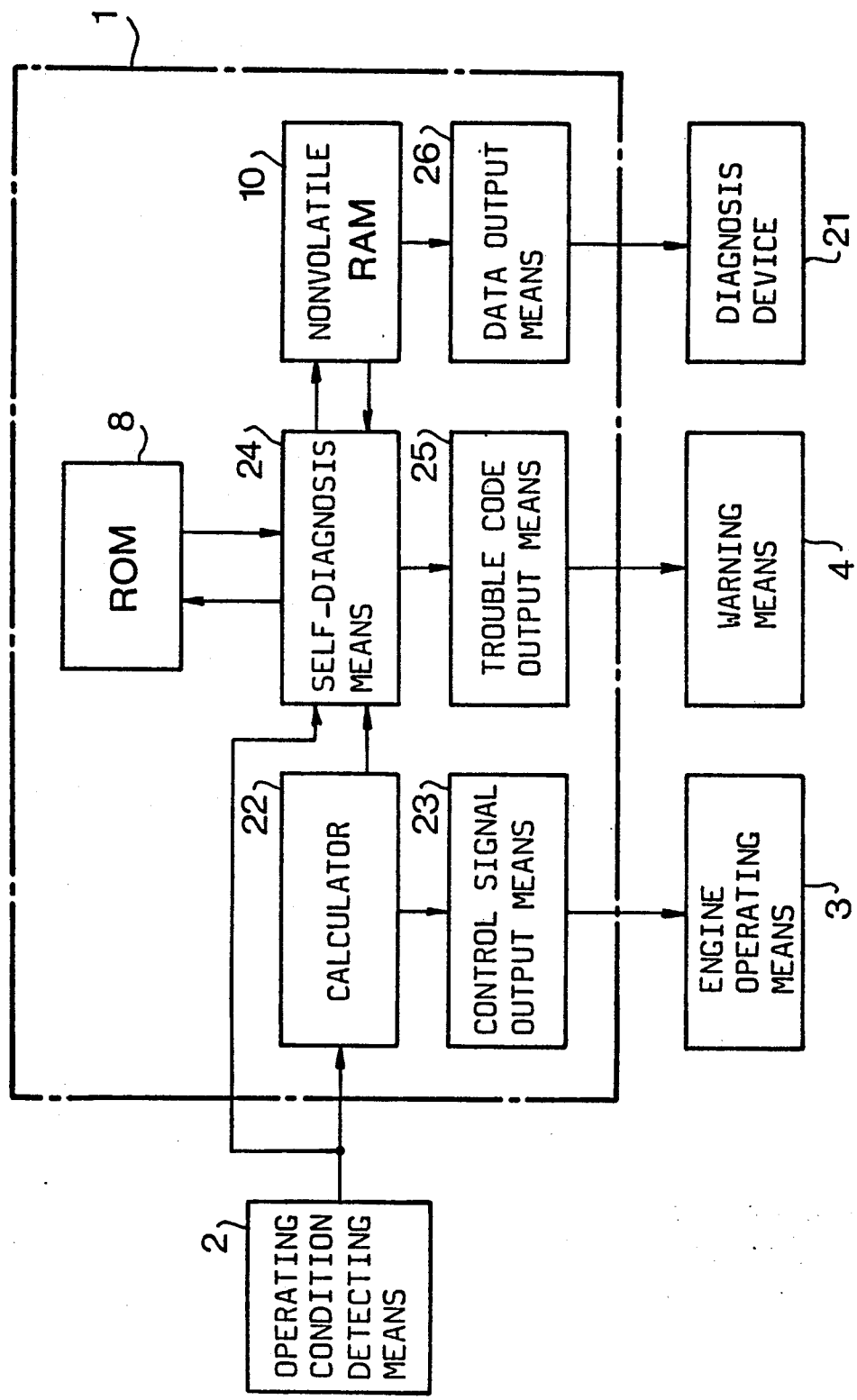
FIG. 2 is a block diagram showing a main part of the system.

The control system 1 is described more in detail with reference to FIG. 2. The control system 1 is provided with a self-diagnosis means 24, to which output signals of the engine operating condition detecting means 2 and output signals of a engine control data calculator 22 are applied. The calculator 22 calculates engine control data such as fuel injection pulse width and ignition timing in dependency on the operating conditions. A pulse width duty signal and an ignition signal from the calculator 22 are applied to the engine operating means 3 through a control signal output means 23.

Figure 4:
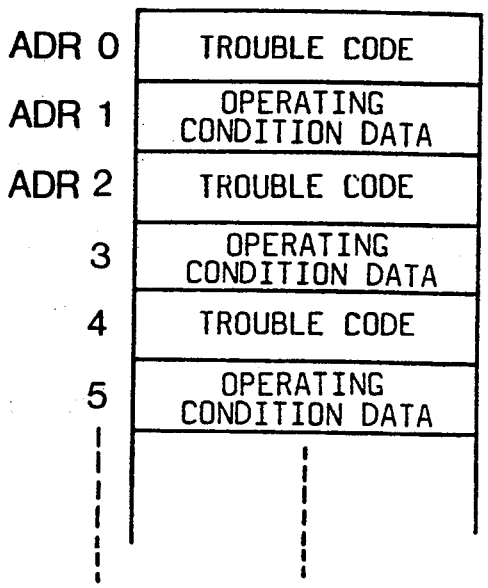
FIG. 4 is a diagram showing a table for storing trouble codes and engine operating condition data.

When an abnormality is detected in dependency on the output signals of the engine operating condition detecting means 2 and the calculator 22, a trouble data signal is applied to the ROM 8 from which a trouble code representing defective parts and conditions of the trouble are read out. The trouble codes retrieved from the ROM 8 and data on operating conditions at the time when the trouble occurred, which are temporarily stored in the RAM 9, are sequentially stored at predetermined addresses in the nonvolatile RAM 10 as shown in FIG. 4. Furthermore, the self-diagnosis means 24 applies a trouble code signal, dependent on the trouble code stored in the RAM 10 to the warning means 4 through a trouble code output means 25 so as to indicate the trouble code by flashing the warning lamps 20.

When the outside diagnosis device 21 is connected to the control system 1 and a trouble data demand signal is applied thereto, the trouble code and operating condition data stored in the nonvolatile RAM 10 are applied to the diagnosis device 21 through a data output means 26 to alternately indicate the trouble code and operating condition data on the display 21a. The diagnoses device 21 and the data output means 26 comprise a trouble code display means.

Figure 3:
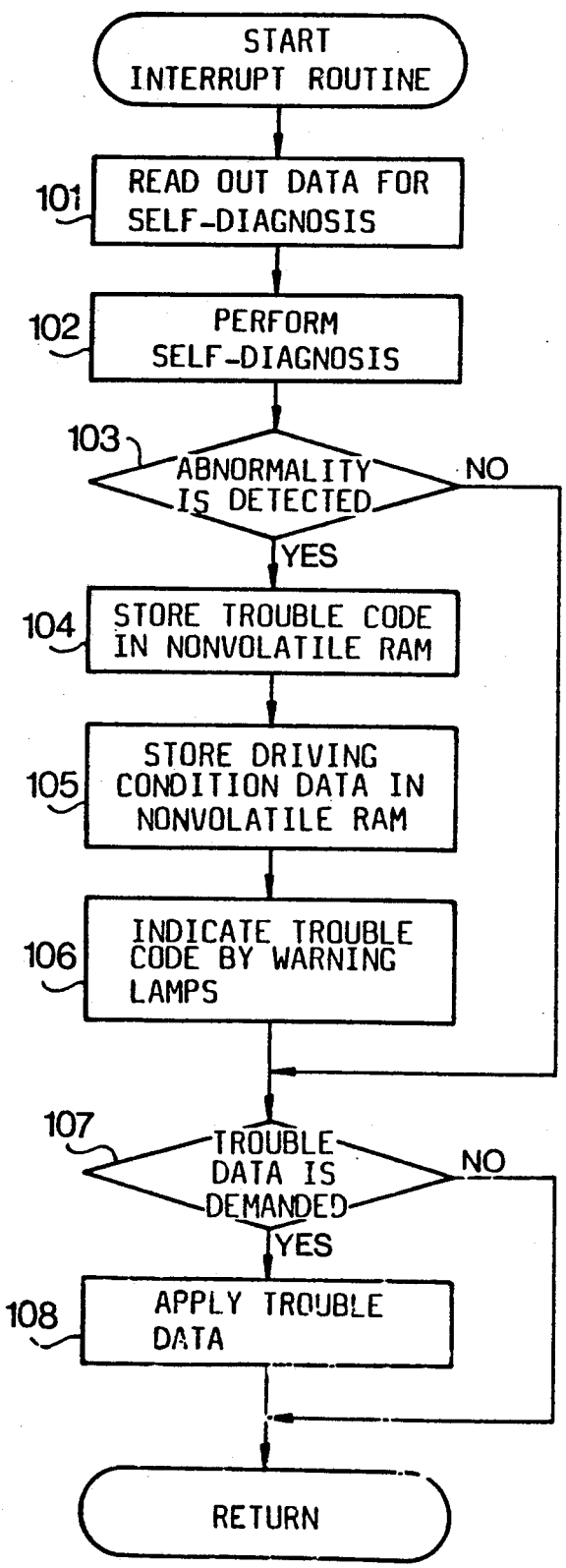
FIG. 3 is a flowchart showing an operation of the system.

The operation of the system is described hereinafter with reference to the flowchart of FIG. 3. During the running of the engine, the control system performs a main routine of a control program for controlling air-fuel ratio and ignition timing. During the main routine, an interrupt request signal is applied to the self-diagnosis means 24 at every predetermined cycle, so that the following self-diagnosis program is performed.

At a step 101, data necessary for the self-diagnosis is read out from the engine operating condition detecting means 2 and at a step 102, the self-diagnosis dependent on the data is performed in the self-diagnosis means 24. At a step 103, it is determined whether there is an abnormality in the control system. When there is an abnormality, the program goes to a step 104 where a trouble code representing the defective parts which causes the abnormality in the control system 1 is retrieved from the ROM 8 and stored in the nonvolatile RAM 10. At a step 105, data on the operating conditions, of which the trouble has occurred, is read out from the RAM 9 and also stored in the nonvolatile RAM 10. At a step 106, the trouble code is indicated by flashing the warning lamps 20.

At a step 107, it is determined whether a trouble data demand signal is applied to the control system 1 from the outside diagnosis device 21. When the demand signal is not applied, the program returns to the main routine. On the other hand, when the demand signal is applied, the trouble code data and the operating condition data stored in the RAM 10 are fed to the diagnosis device 21 through the data output means 26 at a step 108. The operating condition signal in the form of binary digit is converted into a decimal digit. Consequently, the trouble code and operating condition data are indicated on the display 21a by turns. Thus, the diagnostician confirms the defective part and the condition of the trouble corresponding to the indicated code in accordance with an instruction manual. At the same time, the trouble can reoccur in dependency on the operating condition data so that the control system can be accurately repaired. When it is determined that there is no abnormality at the step 103, the program proceeds directly to the step 107.

FIGS. 5 and 6 show a modification of the control system 1 of the present invention. In the aforementioned system, data of operating conditions (engine parameter) upon trouble are stored in the RAM 10. In the modification, various diagnosing data used to determine an abnormality in the control system 1 are stored in the nonvolatile RAM 10 at a step 105a instead of data on the operating conditions as shown in FIG. 6. Namely, when abnormality is detected in the course of self-diagnosis program, the diagnosing data used in the diagnosis as well as the trouble code are stored in the predetermined addresses of the nonvolatile RAM 10 (steps 104 and 105a).

In accordance with the present invention, even in a case of an abnormality which can not reoccur in an auto shop, since the engine operating conditions under which abnormality has actually occurred are shown, the cause of the abnormality is easily discovered. Consequently, the abnormality can be properly repaired in a short time.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A self-diagnosis system for diagnosing an electronic control system for a motor vehicle, the control system being connected to sensing means for detecting operation conditions of the vehicle and for generating an operating condition signal, and the control system having a calculator responsive to said operating condition signal for calculating output data to control the vehicle and for outputting a data signal, an improvement of the self-diagnosis system which comprises:
    self-diagnosis means responsive to said operating condition signal and said data signal for automatically diagnosing said operating condition signal and said data signal so as to detect an abnormality and to retrieve a trouble code from a memory and for producing a trouble code signal;
    trouble code output means responsive to said trouble code signal for indicating said trouble code by flashing a warning lamp;
    nonvolatile memory means responsive to said trouble code signal for storing said trouble code and said output data corresponding thereto; and
    trouble code display means responsive to said trouble code for displaying both said trouble code and said output data stored in the nonvolatile memory means so as to immediately and exactly indicate said output data when the abnormality occurred.
2. The system according to claim 1, wherein said trouble code display means includes an outside diagnosis device having a display.
3. The system according to claim 2, wherein said outside diagnosis device has a keyboard and produces a diagnosis data demand signal so as to transmit and display said code and said output data corresponding to said abnormality.

4. The system according to claim 1, wherein said trouble code display means displays said trouble code and said output data in turns.

5. A self-diagnosing system for diagnosing an electronic control system for a motor vehicle, the control system being connected to sensing means for detecting operation conditions of the vehicle and for generating an operating condition signal, and the control system having a calculator responsive to said operating condition signal for calculating output data to control the vehicle and for outputting a data signal, an improvement of the self-diagnosis system which comprises:

self-diagnosis means responsive to said operating condition signal and said data signal for automatically diagnosing said operating condition signal and said data signal so as to detect an abnormality and to retrieve a trouble code from a memory and for producing a trouble code signal;

trouble code output means responsive to said trouble code signal for indicating said trouble code by flashing a warning lamp;

nonvolatile memory means responsive to said trouble code signal for storing said trouble code and diagnosing data used to determine the abnormality determined by said self-diagnosis means; and trouble code display means responsive to said trouble code for displaying both said trouble code and said diagnosing data stored in the nonvolatile memory means when the abnormality occurred.

* * * * *